(12) United States Patent
Gao et al.

(10) Patent No.: US 8,980,477 B2
(45) Date of Patent: Mar. 17, 2015

(54) LITHIUM METAL DISPERSION IN SECONDARY BATTERY ANODES

(75) Inventors: Yuan Gao, Monroe, NJ (US); John L. Burba, III, Charlotte, NC (US); John F. Engel, Belmont, CA (US); Marina V. Yakovleva, Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 778 days.

(21) Appl. No.: 10/324,611

(22) Filed: Dec. 20, 2002

(65) Prior Publication Data
US 2004/0002005 A1 Jan. 1, 2004

Related U.S. Application Data

(63) Continuation-in-part of application No. 10/025,946, filed on Dec. 19, 2001, now Pat. No. 6,706,447.

(60) Provisional application No. 60/257,994, filed on Dec. 22, 2000.

(51) Int. Cl.
*H01M 4/13* (2010.01)
*H01M 4/40* (2006.01)
(Continued)

(52) U.S. Cl.
CPC . *H01M 4/40* (2013.01); *H01M 4/02* (2013.01); *H01M 4/13* (2013.01); *H01M 4/133* (2013.01);
(Continued)

(58) Field of Classification Search
CPC ...... B22F 9/06; B22F 1/0088; B22F 2998/10; B22F 2999/00; B22F 9/082; B22F 1/02; B22F 1/0085; B22F 2998/00; B22F 1/0059; B22F 1/0062; B22F 2201/00; B22F 2201/11; B22F 2202/17; Y02E 60/122; Y02T 10/7011; H01M 10/0525; H01M 4/134; H01M 4/382

USPC ........ 429/326, 231.8, 231.95, 309, 209, 212, 429/231.4, 231.7
See application file for complete search history.

(56) References Cited

U.S. PATENT DOCUMENTS 3,508,967 A    4/1970  Lyall et al.
4,863,817 A *  9/1989  Ogino et al. .................. 429/224
(Continued)

FOREIGN PATENT DOCUMENTS

DE    689 10 843       8/1989    ............ H01M 10/40
EP    0 328 131 B1     8/1989    ............ H01M 10/40
(Continued)

OTHER PUBLICATIONS

"Microencapsulation of Lithium", *U.S. Dept. of Commerce National Technical Information Service* (Dec. 31, 1985) 68 pages.
(Continued)

*Primary Examiner* — Patrick Ryan
*Assistant Examiner* — Ben Lewis
(74) *Attorney, Agent, or Firm* — Myers Bigel Sibley & Sajovec, P.A.

(57) ABSTRACT

The present invention is a secondary battery having a high specific capacity and good cycleability, and that can be used safely. The secondary battery is manufactured to include an anode formed from a host material capable of absorbing and desorbing lithium in an electrochemical system such as a carbonaceous material, and lithium metal dispersed in the host material. The anodes of the invention are combined with a cathode including an active material, a separator that a separates the cathode and the anode, and an electrolyte in communication with the cathode and the anode. The present invention also includes a method of preparing an anode and a method of operating a secondary battery including the anode of the invention.

14 Claims, 2 Drawing Sheets

(51) Int. Cl.
 *H01M 4/02* (2006.01)
 *H01M 4/133* (2010.01)
 *H01M 10/0525* (2010.01)
 *H01M 10/44* (2006.01)

(52) U.S. Cl.
 CPC .......... *H01M 4/405* (2013.01); *H01M 10/0525* (2013.01); *H01M 10/44* (2013.01); *H01M 2004/021* (2013.01); *Y02E 60/122* (2013.01); *Y02T 10/7011* (2013.01)
 USPC .... 429/231.95; 429/309; 429/209; 429/231.4

(56) References Cited

U.S. PATENT DOCUMENTS

| | | | |
|---|---|---|---|
| 4,945,014 A | 7/1990 | Miyabayashi et al. | |
| 5,028,500 A | 7/1991 | Fong et al. | |
| 5,162,176 A | 11/1992 | Herr et al. | |
| 5,187,035 A | 2/1993 | Miyabayashi et al. | |
| 5,312,611 A | 5/1994 | Takami et al. | 423/447.6 |
| 5,312,623 A | 5/1994 | Plichta et al. | |
| 5,643,665 A * | 7/1997 | Saidi | 428/330 |
| 5,707,756 A * | 1/1998 | Inoue et al. | 429/57 |
| 5,725,968 A | 3/1998 | Sato et al. | 429/218 |
| 5,747,194 A * | 5/1998 | Davidson et al. | 429/224 |
| 5,753,387 A | 5/1998 | Takami et al. | 429/194 |
| 5,753,388 A | 5/1998 | Koksbang et al. | |
| 5,807,645 A | 9/1998 | Takeuchi et al. | |
| 5,948,569 A | 9/1999 | Moses et al. | 429/246 |
| 5,951,919 A | 9/1999 | Hwang et al. | |
| 5,958,622 A | 9/1999 | Kojima et al. | 429/218.1 |
| 6,156,457 A | 12/2000 | Takami et al. | 429/231.4 |
| 6,168,885 B1 * | 1/2001 | Narang et al. | 429/214 |
| 6,183,911 B1 * | 2/2001 | Kweon et al. | 429/224 |
| 6,265,110 B1 | 7/2001 | Rao et al. | |
| 6,270,926 B1 | 8/2001 | Yamashita et al. | 429/231.1 |
| 6,271,645 B1 * | 8/2001 | Schneider et al. | 320/118 |
| 6,387,564 B1 * | 5/2002 | Yamashita et al. | 429/132 |
| 6,465,126 B1 * | 10/2002 | Jannasch et al. | 429/217 |
| 6,541,156 B1 | 4/2003 | Fuse et al. | |
| 6,613,475 B2 * | 9/2003 | Fauteux et al. | 429/215 |
| 6,706,447 B2 | 3/2004 | Gao et al. | |
| 2002/0119373 A1 | 8/2002 | Gao et al. | |
| 2004/0146784 A1 | 7/2004 | Gao et al. | |
| 2005/0130043 A1 | 6/2005 | Gao et al. | |

FOREIGN PATENT DOCUMENTS

| | | | |
|---|---|---|---|
| EP | 0763865 A1 | 1/1992 | ............ H01M 10/40 |
| EP | 0573266 A1 | 6/1993 | ............ H01M 4/58 |
| EP | 0601832 A1 | 12/1993 | ............ H01M 4/58 |
| EP | 0696075 A2 | 8/1995 | ............ H01M 4/48 |
| EP | 0696075 A3 | 8/1995 | ............ H01M 4/48 |
| JP | 58-199806 | 11/1983 | |
| JP | 63-13282 | 1/1988 | ............ H01M 10/40 |
| JP | 63178449 | 7/1988 | |
| JP | 4-39859 | 2/1992 | ............ H01M 4/02 |
| JP | 4-126374 | 4/1992 | ............ H01M 10/40 |
| JP | 04190555 | 7/1992 | |
| JP | 5-234621 | 9/1993 | ............ H01M 10/40 |
| JP | 05234621 | 9/1993 | |
| JP | 10-117406 | 5/1998 | |
| JP | 10-223259 | 8/1998 | ............ H01M 10/40 |
| JP | 10223259 | 8/1998 | |
| JP | 10-270086 | 10/1998 | ............ H01M 10/40 |
| JP | 11-025975 | 1/1999 | |
| JP | 11025975 | 1/1999 | |
| JP | 11120993 | 4/1999 | |
| JP | 2000-67853 | 3/2000 | ............ H01M 4/02 |
| JP | 2000-164210 | 6/2000 | ............ H01M 4/38 |
| JP | 2000164210 A | 6/2000 | |
| JP | 2001229977 | 8/2001 | |
| KR | 2001-0037101 | 5/2001 | |
| WO | WO00/13249 | 3/2000 | ............ H01M 10/40 |
| WO | WO 02/21632 A1 | 3/2002 | |

OTHER PUBLICATIONS

Notification of Transmittal of the International Search Report and the Written Opinion of the International Searching Authority, or the Declaration, PCT/US2004/24502, Dec. 7, 2004.
U.S. Appl. No. 10/900,715, filed Jul. 28, 2004, Gao et al.
U.S. Appl. No. 10/760,007, filed Jan. 16, 2004, Gao et al.
Notice to Submit Response to the Examination Report corresponding to Korean Patent Application No. 10-2002-0023709 mailed Sep. 28, 2006.
Supplementary Search and Examination Report corresponding to Great Britain Application No. 04779517 dated Feb. 20, 2009.
Canadian Office Action corresponding to Canadian Application No. 2384494 dated Mar. 10, 2009.
Search Report corresponding to French Application No. 0205144 dated May 15, 2009.
European Search Report corresponding to Great Britain application No. GB 0209424.1; Date of Mailing: Jul. 11, 2002.
Kwon et al. "Characteristics of a lithium-polymer battery based on a lithium powder anode", *J. of Power Sources* 93:145-150 (2001).
Office Action corresponding to Canadian Application No. 2,384,494 dated Apr. 11, 2012.
Office Action corresponding to Canadian Application No. 2,384,494 dated Feb. 7, 2013.
Second Office Action corresponding to Canadian Application No. 2,384,494 dated Dec. 4, 2013.

* cited by examiner

US 8,980,477 B2

LITHIUM METAL DISPERSION IN SECONDARY BATTERY ANODES

CROSS-REFERENCE TO RELATED APPLICATIONS

This application is a Continuation-in-part of the commonly owned U.S. patent application Ser. No. 10/025,946, filed Dec. 19, 2001 U.S. Pat. No. 6,706,447, which claims the benefit of the earlier filing date of commonly owned provisional application Ser. No. 60/257,994, filed Dec. 22, 2000.

FIELD OF THE INVENTION

The present invention relates to secondary batteries having high specific capacities and particularly to anodes for secondary batteries comprising a host material, such as a carbonaceous material capable of absorbing and desorbing lithium in an electrochemical system, and lithium metal dispersed in the host material.

BACKGROUND OF THE INVENTION

Lithium and lithium-ion secondary or rechargeable batteries have found use in certain applications such as in cellular phones, camcorders, and laptop computers, and even more recently, in larger power applications such as in electric vehicles and hybrid electric vehicles. It is preferred in these applications that the secondary batteries have the highest specific capacity possible but still provide safe operating conditions and good cycleability so that the high specific capacity is maintained in subsequent recharging and discharging cycles.

Although there are various constructions for secondary batteries, each construction includes a positive electrode (or cathode), a negative electrode (or anode), a separator that separates the cathode and anode, and an electrolyte in electrochemical communication with the cathode and anode. For secondary lithium batteries, lithium ions are transferred from the anode to the cathode through the electrolyte when the secondary battery is being discharged, i.e., used for its specific application. During the discharge process, electrons are collected from the anode and pass to the cathode through an external circuit. When the secondary battery is being charged or recharged, the lithium ions are transferred from the cathode to the anode through the electrolyte.

Historically, secondary lithium batteries were produced using non-lithiated compounds having high specific capacities such as $TiS_2$, $MoS_2$, $MnO_2$ and $V_2O_5$, as the cathode active materials. These cathode active materials were coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990's in favor of lithium-ion batteries.

Lithium-ion batteries typically use lithium metal oxides such as $LiCoO_2$ and $LiNiO_2$ as cathode active materials coupled with a carbon-based anode. In these batteries, the lithium dendrite formation on the anode is avoided, thereby making the battery safer. However, the lithium, the amount of which determines the battery capacity, is totally supplied from the cathode. This limits the choice of cathode active materials because the active materials must contain removable lithium. Also, delithiated products corresponding to $LiCoO_2$ and $LiNiO_2$ formed during charging (e.g. $Li_xCoO_2$ and $Li_xNiO_2$ where $0.4<x<1.0$) and overcharging (i.e. $Li_xCoO_2$ and $Li_xNiO_2$ where $x<0.4$) are not stable. In particular, these delithiated products tend to react with the electrolyte and generate heat, which raises safety concerns.

Furthermore, new lithium-ion cells or batteries are initially in a discharged state. During the first charge of lithium-ion cell, lithium moves from the cathode material, such as $LiCoO_2$ or $LiNiO_2$, to the anode material, such as graphite. The lithium moving from the cathode to the anode reacts with an electrolyte material in the cell, causing the formation of a passivation film on the anode. The passivation film formed on the anode is a solid electrolyte interface or SEI. Upon subsequent discharge, the lithium consumed by the formation of the SEI is not returned to the cathode. This results in a lithium-ion cell having a smaller capacity compared to the initial charge capacity because some of the lithium has been consumed by the formation of the SEI. The consumption of the available lithium reduces the capacity of the lithium-ion cell. This phenomenon is called irreversible capacity and is known to consume about 10% to 20% of the capacity of a lithium ion cell. Thus, after the initial charge of a lithium-ion cell, the lithium-ion cell loses about 10% to 20% of its capacity.

SUMMARY OF THE INVENTION

The present invention relates to absorbing and desorbing lithium in an electrochemical system. More particularly, the present invention relates to a battery or electrochemical cell including an electrode having lithium metal dispersed in a host material that is capable of absorbing and desorbing lithium in an electrochemical system. Batteries and/or electrochemical cells employing electrodes according to the embodiments of the invention may exhibit high specific capacities, good cycleability, and improved operational safety.

It is understood for the purposes of this invention that the term "battery" may mean and include a single electrochemical cell, or unicell, and/or one or more electrochemical cells connected in series and/or in parallel as known by those of skill in the art. Furthermore, the term "battery" includes, but is not limited to, rechargeable batteries and/or secondary batteries and/or electrochemical cells.

A battery according to embodiments of the invention can include a positive electrode (cathode) comprising an active material, a negative electrode (anode) comprising a host material capable of absorbing and desorbing lithium in an electrochemical system and lithium metal dispersed in the host material, a separator separating the cathode and the anode and an electrolyte in communication with the cathode and the anode. Preferably, the cathode active material is a compound that can be lithiated at an electrochemical potential of 2.0 V to 5.0 V versus lithium. For example, the cathode active material can be based on manganese, vanadium, titanium or molybdenum, such as $MnO_2$, $V_2O_5$, $V_6O_{13}$, $LiV_3O_8$, $MoO_3$, $TiS_2$, or $MoS_2$, or a mixture thereof. The cathode active material may include lithium metal, such as lithium powder, incorporated with a cathode active material that can be lithiated, such as $MnO_2$, $V_2O_5$, $V_6O_{13}$, $LiV_3O_8$, $MoO_3$, $TiS_2$, or $MoS_2$, or a mixture thereof. The anode host material may comprise one or more materials selected from the group consisting of carbonaceous materials, Si, Sn, tin oxides, composite tin alloys, transition metal oxides, lithium metal nitrides and lithium metal oxides. Preferably, the anode host material comprises a carbonaceous material and, more preferably, comprises graphite. The lithium metal dispersed in the host material is preferably a finely divided lithium powder and in other embodiments a finely divided lithium powder having a mean particle size of less than about 20 microns. The amount of lithium metal dispersed in the anode is preferably no more than the maximum amount sufficient to intercalate in, alloy with, and/or be absorbed by the host material in the anode. For example, if the host material is carbon, the amount of lithium dispersed in the host material is preferably no more than the amount needed to make $LiC_6$. The electrolyte and separator can be separate materials, such as a porous separator and fluid electrolyte, or can include a unitary structure or material, such as a gelled polymer that acts as both a separator and an electrolyte.

Embodiments of the present invention also include methods of preparing an electrode for a battery including providing a host material capable of absorbing and desorbing lithium in an electrochemical system, dispersing lithium metal in the host material, and forming the host material and the lithium metal dispersed therein into an electrode, for example, an anode. The lithium metal and the host material are preferably mixed together with a binder polymer and at least one solvent to produce a slurry. The slurry is applied to a current collector and dried to form the electrode. Alternatively, an electrode can be formed by chemical means by immersing the host material in a suspension of lithium metal in a non-aqueous liquid, and then forming the host material into an electrode.

The present invention further includes methods of operating a battery. A battery according to some embodiments of the invention is provided in a charged state. The battery is preferably in a fully charged state having all of the removable lithium present in the battery in the anode of the battery. The battery is discharged by transmitting lithium ions from the anode to the cathode through the electrolyte or electrolyte/separator combination. The battery can be charged or recharged by transmitting lithium ions from the cathode to the anode through the electrolyte and then discharged again by transmitting lithium ions from the anode to the cathode. The charging and discharging steps can occur for numerous cycles while maintaining the high specific capacities of the cathode active materials and maintaining safe operating conditions.

In other embodiments, a battery may be provided in an uncharged state as known with conventional lithium-ion batteries. Lithium metal may be provided in the anode and the cathode. For example, the anode of a traditional lithium-ion battery may be replaced by an anode including lithium according to embodiments of the present invention. The introduction of an electrolyte into the battery promotes a reaction between the electrolyte and lithium metal in the anode, forming a solid electrolyte interface (SEI) at the anode. Charging the battery for the first time may accelerate the formation of the SEI. Formation of the SEI from the lithium metal in the anode may reduce and/or eliminate capacity losses in the battery due to irreversible capacity losses caused by SEI consumption of lithium from the cathode.

These and other features and advantages of the present invention will become more readily apparent to those skilled in the art upon consideration of the following detailed description and accompanying drawing, which describe both the preferred and alternative embodiments of the present invention.

DETAILED DESCRIPTION OF THE EMBODIMENTS OF THE INVENTION

Figure 1:
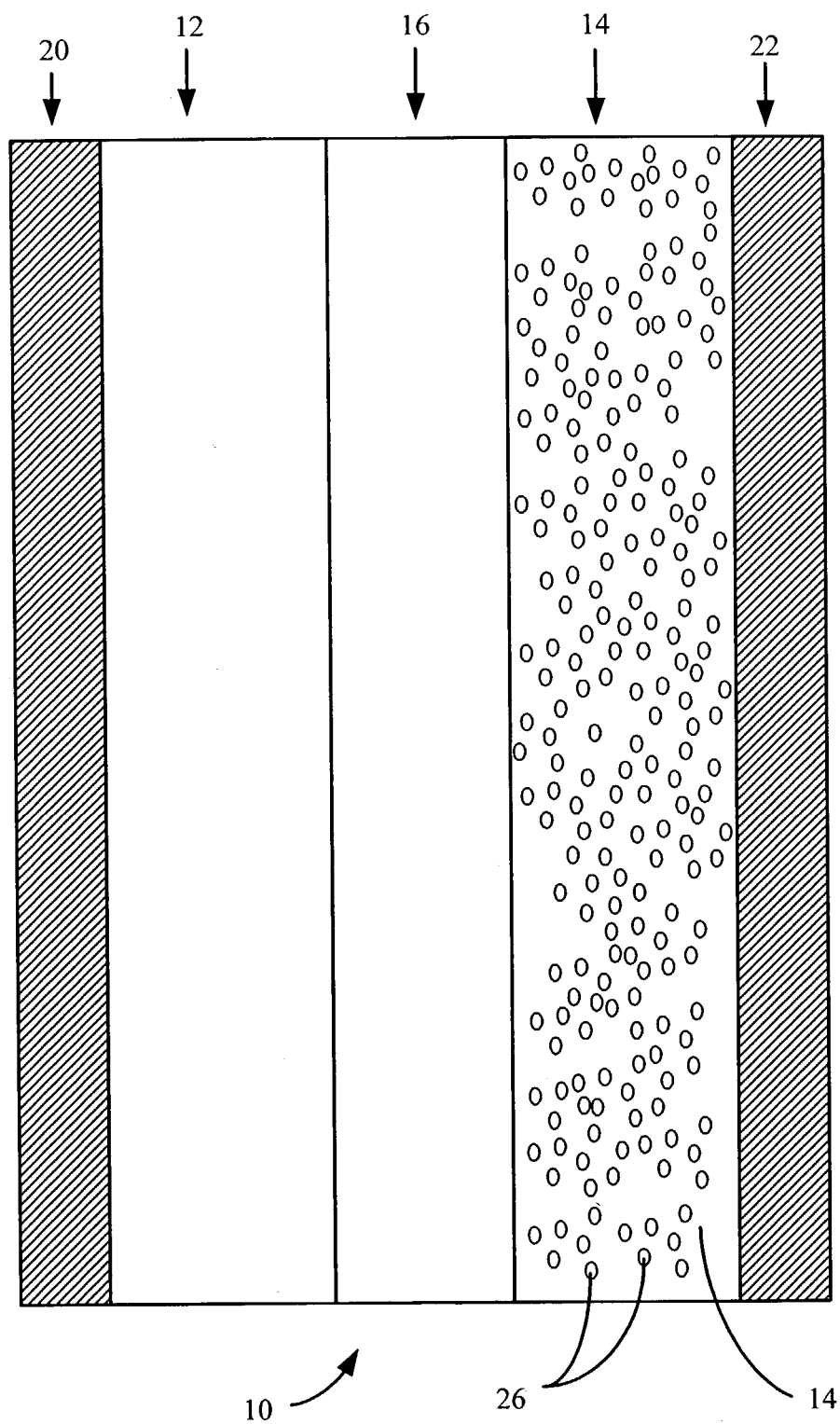
FIG. 1 illustrates a simplified secondary battery construction including a cathode, anode, separator and electrolyte, in accordance with the invention.

In the drawings and the following detailed description, embodiments of the present invention are described in detail to enable practice of the invention. Although the invention is described with reference to these specific embodiments, it is understood that the invention is not limited to these embodiments. The invention includes numerous alternatives, modifications, and equivalents as will become apparent from consideration of the following detailed description and accompanying drawings.

As illustrated in FIG. 1, embodiments of the present invention relate to a battery 10 including a positive electrode, or cathode 12, a negative electrode, or anode 14, and a material 16. The material 16 may include a separator for separating the cathode 12 and the anode 14. Material 16 may also include an electrolyte in electrochemical communication with the cathode 12 and the anode 14. The battery 10 also includes a current collector 20 in electrical contact with the cathode 12 and a current collector 22 in electrical contact with the anode 14. The current collectors 20 and 22 may be in electrical contact with one another through an external circuit (not shown). The battery 10 can have any construction known in the art, such as a "jelly roll," stacked construction, or the like.

The cathode 12 is formed of an active material, which is typically combined with a carbonaceous material and a binder polymer. The active material of the cathode 12 is preferably a material that can be lithiated and/or delithiated at a useful voltage (e.g. 2.0 V to 5.0 V versus lithium). Preferably, non-lithiated materials based on manganese, vanadium, titanium or molybdenum, such as such as $MnO_2$, $V_2O_5$, $V_6O_{13}$, $MoO_3$, $TiS_2$, $MoS_2$, or mixtures thereof, can be used as the active material. More preferably, $MnO_2$ is used as the cathode active material. However, lithiated materials can also be used to form cathode 12. For instance, $LiMn_2O_4$ or $LiV_3O_8$ can be used. Further, the active material can be a material mixed with lithium. For instance, an active material may be mixed with lithium powder.

Non-lithiated active materials are preferred as the cathode 12 active material because they generally have higher specific capacities than the lithiated active materials and can provide increased power over batteries that include lithiated active materials. Furthermore, because the anode 14 includes lithium, it is not necessary for the cathode 12 to include a lithiated material for the battery 10 to operate. The amount of active material provided in the cathode 12 is preferably sufficient to accept the removable lithium present in the anode 14. For example, if $MnO_2$ is the cathode 12 active material, then one mole of $MnO_2$ is preferably present in the cathode 12 per mole of lithium in the anode 14 to produce $LiMnO_2$ in the cathode 12 upon discharge.

The removable lithium cycled in the battery may be provided by the anode 14 and the battery may be assembled or prepared in a fully charged state. Preparation of the battery in a fully charged state allows the use of non-lithiated active materials capable of being lithiated for forming cathode 12. In other embodiments, lithium powder may be mixed with non-lithiated active materials capable of being lithiated to form a cathode 12 to provide a discharged cathode in a battery.

Nevertheless, cathode 12 can also include a minor amount of one or more lithiated active materials (e.g. $LiCoO_2$ or $LiNiO_2$) that do not further absorb lithium at a voltage between 2.0V and 5.0V and the battery can still be provided in a primarily charged state. The cathode 12 may also include lithium metal (e.g. lithium powder). The cathode preferably has less than 50% (molar) and more preferably less than 10% (molar) of the lithiated material (e.g. $LiCoO_2$, $LiNiO_2$, or lithium powder) as the active material. Because $LiCoO_2$ and $LiNiO_2$ do not further absorb lithium at above 2.0V, the presence of these materials in the cathode 12 does not reduce the amount of cathode active material needed to accept the removable lithium from the anode 14.

The anode 14 may be formed of a host material 24 capable of absorbing and desorbing lithium in an electrochemical system with lithium metal 26 dispersed in the host material. For example, the lithium present in the anode 14 can intercalate in, alloy with, or be absorbed by the host material 24 when the battery (and particularly the anode 14) is recharged. The host material 24 includes materials capable of absorbing and desorbing lithium in an electrochemical system such as carbonaceous materials; materials containing Si, Sn, tin oxides or composite tin alloys; transition metal oxides such as CoO; lithium metal nitrides such as $Li_{3-x}Co_xN$ where $0<x<0.5$, and lithium metal oxides such as $Li_4Ti_5O_{12}$. Preferably, the host material 24 includes graphite. In addition, the host material 24 can include a small amount of carbon black (e.g. less than 5% by weight) as a conducting agent. The lithium metal 26 is preferably provided in the anode 14 as a finely divided lithium powder. More preferably, the lithium metal 26 has a mean particle size of less than about 20 microns, and even more preferably less than about 10 microns, although larger particle sizes may also be used. The lithium metal can be provided as a pyrophoric powder or as a stabilized low pyrophorosity powder, for example, by treating the lithium metal powder with $CO_2$.

The anode 14 is capable of reversibly lithiating and delithiating at an electrochemical potential relative to lithium metal of from greater than 0.0 V to less than or equal to 1.5 V. If the electrochemical potential is 0.0 V or less versus lithium, then the lithium metal will not reenter the anode 14 during charging. Alternatively, if the electrochemical potential is greater than 1.5 V versus lithium then the battery voltage will be undesirably low. Preferably, the amount of lithium metal 26 present in the anode 14 is no more than the maximum amount sufficient to intercalate in, alloy with, or be absorbed by the host material 24 in the anode 14 when the battery is recharged. For example, if the host material 24 is graphite, the amount of lithium 26 is preferably no more than the amount sufficient to make $LiC_6$. In other words, the molar ratio of lithium to carbon in the anode is preferably no more than 1:6.

In accordance with embodiments of the invention, the anode 14 can be prepared by providing a host material 24 that is capable of absorbing and desorbing lithium in an electrochemical system, dispersing lithium metal 26 in the host material 24, and forming the host material 24 and the lithium metal 26 dispersed therein into an anode 14. Preferably, the lithium metal 26 and the host material 24 are mixed with a non-aqueous liquid and a binder, and formed into a slurry. The slurry is then used to form the anode 14, for example, by coating a current collector 22 with the slurry and then drying the slurry.

Formation of an anode 14, or other type of electrode, according to embodiments of the invention is achieved by combining a lithium metal powder, a fine particle host material, a binder polymer, and a solvent to form a slurry. The slurry can be coated on a current collector and dried to form the anode 14. For example, a lithium metal powder may be combined with a fine particle host material such as meso carbon micro beads (MCMB), graphite, carbon black, or other lithium-ion anode materials to form a mixture. A binder polymer and solvent may be combined with the mixture to form the desired slurry. To form an anode 14, the slurry is coated on a current collector, such as copper foil or mesh, and allowed to dry. The dried slurry and current collector combination provide the anode 14.

Binder polymers used with embodiments of the invention include binder polymers that are sufficiently non-reactive with the lithium in the anode 14. Binder polymers capable of maintaining the stability of lithium during the anode 14 formation process and capable of providing stable anodes 14 are preferred. In addition, the binder polymers are preferably soluble in a chosen solvent or co-solvent at the temperatures used in the anode 14 production process. Some examples of preferred binder polymers that may be used with embodiments of the present invention include polyvinylidene fluoride, ethylene propylene diene terpolymer, ethylene propylene diene monomer, ethylene acrylic acid, ethylene vinyl acetate, and styrene-butadiene rubber.

Solvents used with embodiments of the invention must also be non-reactive with the lithium metal and the binder polymers at the temperatures used in the anode 14 production process. Preferably, a solvent or co-solvent possesses sufficient volatility to readily evaporate from a slurry to promote the drying of a slurry applied to a current collector. For example, solvents may include acyclic hydrocarbons, cyclic hydrocarbons, aromatic hydrocarbons, symmetrical ethers, unsymmetrical ethers, and cyclic ethers.

Lithium metal used with various embodiments of the present invention may be provided as lithium powder. The lithium powder may be treated or otherwise conditioned for stability during transportation. For instance, dry lithium powder may be formed in the presence of carbon dioxide as conventionally known. The dry lithium powder may be used with the various embodiments of the present invention. Alternatively, the lithium powder may be formed in a suspension, such as in a suspension of mineral oil solution or other solvents. Formation of lithium powder in a solvent suspension may facilitate the production of smaller lithium metal particles. In some embodiments of the present invention, a lithium powder may be formed in a solvent that may be used with various embodiments of the present invention. The lithium metal powder formed in the solvent may be transported in the solvent. Further, the lithium metal powder and solvent mixture may be used with embodiments of the present invention, which may remove a mixing step from an electrode production process because the solvent and lithium metal powder are available as a single component. This may decrease production costs and allow the use of smaller or finer lithium metal powder particles with the embodiments of the present invention.

Various binder polymer and solvent combinations were tested with the embodiments of the present invention to determine binder polymer-solvent pairs that are compatible and stable. Further, anodes 14 formed from the binder polymer-solvent pairs were tested to ensure compatibility. Preferred binder polymer-solvent pairs for use with the production of anodes 14 according to some embodiments of the invention are listed in Table I.

TABLE I

| Binder Polymer | Suitable Solvents |
| --- | --- |
| ethylene propylene diene terpolymer or ethylene propylene diene monomer | acyclic and cyclic hydrocarbons, including n-hexane, n-heptane, cyclohexane, and the like; aromatic hydrocarbons such as toluene, xylene, isopropylbenzene (cumene), and the like |
| polyvinylidene fluoride | symmetrical, unsymmetrical, and cyclic ethers, including di-n-butyl ether, methyl t-butyl ether, tetrahydrofuran, and the like |
| ethylene vinyl acetate | aromatic hydrocarbons such as toleune, xylene, isopropylbenzene (cumene), and the like |
| styrene-butadiene rubber | aromatic hydrocarbons such as toluene, xylene, isopropylbenzene (cumene), and the like; symmetrical, unsymmetrical, and cyclic ethers, including di-n-butyl ether, methyl t-butyl ether, tetrahydrofuran, and the like |

It is understood that additional binder polymer-solvent pairs may also be used or combined to form slurries and anodes 14 in accordance with the embodiments of the invention. Representative Examples of tests performed to determine the feasibility for using different binder polymers, solvents, and binder-polymer-solvent pairs with the various embodiments of the present invention are described in Examples 1 through 3.

Example 1

Ethylene Propylene Diene Terpolymer and Cyclohexane

Figure 2:
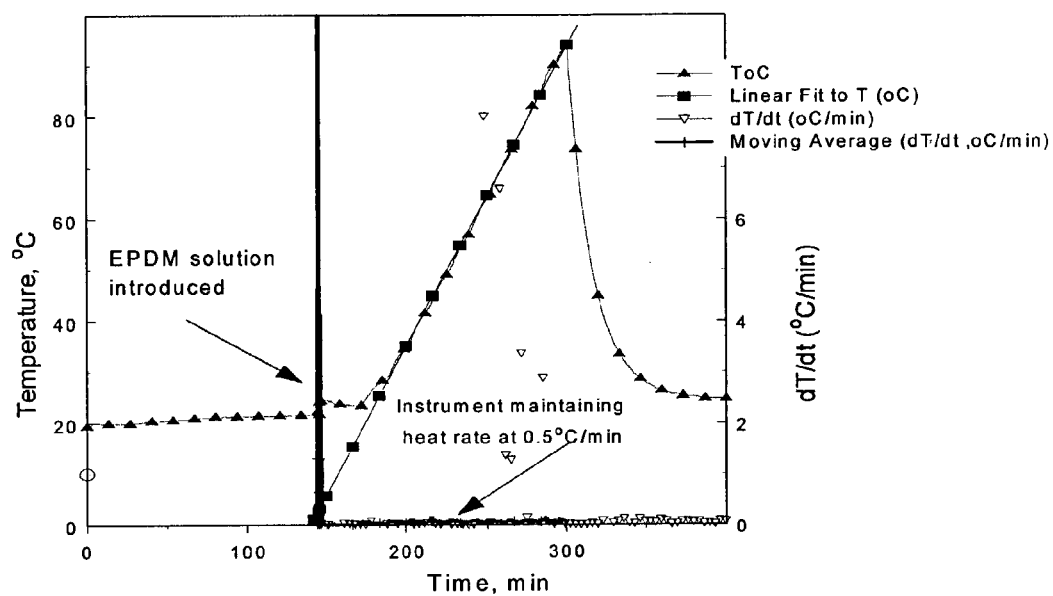
FIG. 2 illustrates results of a Reactive System Screening Tool test for cyclohexane, lithium and ethylene propylene diene terpolymer.

A coating solution containing cyclohexane, lithium powder and ethylene propylene diene terpolymer (Nordel® IP 4570) was tested for thermal stability over the temperature range of interest. The solution consisted of 8.8 ml of cyclohexane, 0.24 g of lithium powder, and 0.127 g of ethylene propylene diene terpolymer. A Reactive System Screening Tool was used as the calorimeter of choice. During the test, the pressure inside the chamber was set at 200 psig using argon to enable testing of the system beyond the boiling point of cyclohexane. No self-heating was detected over a temperature range of 19° C. to 94° C. A plot of the test is illustrated in FIG. 2. The boiling point of cyclohexane is 80.7° C. at 1 atm, so scanning above that temperature was not necessary and the test was stopped at 94° C. As illustrated in FIG. 2, the instrument maintained a steady heat rate of 0.5° C. per minute during the ramp. If self-heating had been detected, the heat rate would have increased above this level. The temperature trend is linear during the heating period which indicates that no self-heating of the material occurred. The lack of self-heating indicates that the combination of ethylene propylene diene terpolymer, cyclohexane, and lithium powder is a stable mixture.

Example 2

Lithium Powder and P-Xylene

Lithium powder, in an amount of 0.531 g, was mixed with 8 ml of p-xylene and a thermal stability test was conducted using the Reactive System Screening Tool described in Example 1. The test was conducted between room temperature and 180° C. No self-heating was detected over this temperature range, indicating that lithium powder is stable in p-xylene between room temperature and 180° C.

Example 3

Dimethyl Propylene Urea and Lithium Powder

Figure 3:
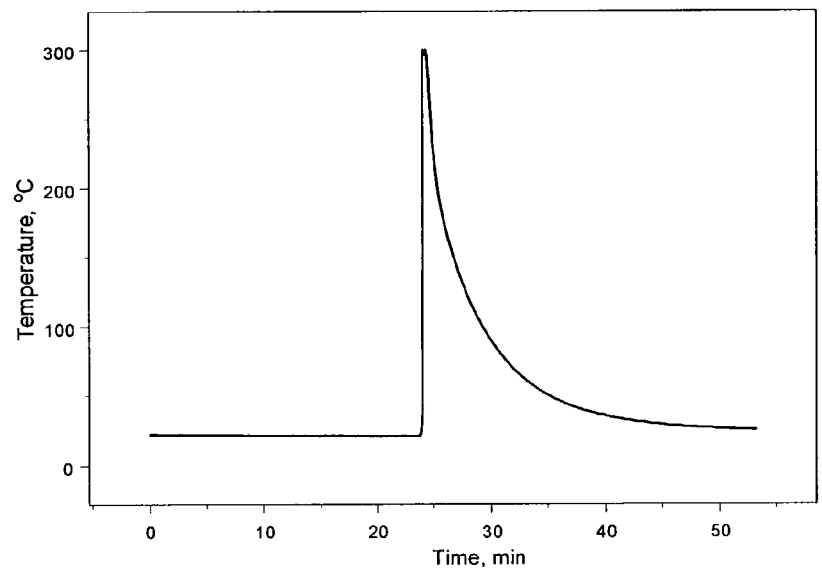
FIG. 3 illustrates results of a Reactive System Screening Tool test for dimethyl propylene urea with lithium powder.

A solution containing dimethyl propylene urea and lithium powder was tested for thermal stability using Reactive System Screening Tool techniques with the same set-up and procedure as described in Example 1. Self-heating was detected within 3 seconds of the addition of dimethyl propylene urea to the lithium powder at a temperature of 25° C. The self-heating increased at a rate of over 1000° C. per minute. FIG. 3 illustrates the thermal run away of the test. The presence of self-heating in the system indicates that the dimethyl propylene urea is not a suitable solvent for forming the anodes of the present invention because it reacts with lithium powder.

In an alternative anode 14 production process, the lithium metal can be provided in the anode 14 by immersing the host material 24 in a suspension containing lithium metal in a non-aqueous liquid such a hydrocarbon solvent (e.g. hexane). The lithium metal 26 used in the suspension is preferably a finely divided lithium powder. The host material 24 can be formed into the shape of the anode and then dipped into the lithium metal suspension or it can be combined with the lithium metal suspension to form a slurry and then applied to the current collector and dried to form the anode 14. The non-aqueous liquid used to form the suspension can be removed by drying the anode 14 (e.g. at an elevated temperature). Regardless of the method used, the lithium metal is preferably distributed as well as possible into the host material.

As illustrated in FIG. 1, the cathode 12 may be separated from the anode 14 by a material 16. Typically, the material 16 is an electrical insulating material such as polyethylene, polypropylene, or polyvinylidene fluoride (PVDF).

The secondary battery 10 further includes an electrolyte that is in electrochemical communication with the cathode 12 and anode 14. The electrolyte can be non-aqueous liquid, gel, or solid and preferably comprises a lithium salt, for example, $LiPF_6$. The electrolyte is provided throughout the battery 10 and particularly within the cathode 12, anode 14 and material 16. Typically, the electrolyte is a liquid, and the cathode 12, anode 14 and material 16 are porous materials that are soaked in the electrolyte to provide electrochemical communication between these components. Alternatively, the material 16 and electrolyte may be a unitary composition. For example, a gelled polymer may be used as both an electrolyte and a separator in the battery.

A battery 10 of an embodiment of the invention includes current collectors 20 and 22, which are used to transmit electrons to an external circuit. Preferably, the current collector 20 is made of aluminum foil and current collector 22 is made of copper foil.

A battery 10 can be prepared by methods known in the art and preferably has a layer thickness within the following ranges:

| Layer | thickness |
| --- | --- |
| Current collector (20) | 10-40 μm |
| Cathode (12) | 70-200 μm |
| Material (16) | 10-35 μm |

-continued

| Layer | thickness |
|---|---|
| Anode (14) | 50-150 μm |
| Current collector (22) | 10-40 μm |

The battery 10 may include an electrolyte dispersed throughout the cathode 12, anode 14 and separator 16, and a casing (not shown). The electrolyte may be integrated with the material 16.

In some embodiments, the battery 10 is initially in a charged state and more preferably a fully charged state. The battery 10 may be discharged by transmitting lithium ions from the anode 14 to the cathode 12 through the electrolyte. At the same time, electrons are transmitted from the anode 14 to the cathode 12 through the current collector 22, the external circuit, and the current collector 20. The battery 10 can be charged or recharged by transmitting lithium ions from the cathode 12 to the anode 14 through the electrolyte. The charging and discharging steps can occur for numerous cycles while maintaining the high specific capacities of the cathode active materials and maintaining safe operating conditions.

In other embodiments, a battery may be provided in an uncharged state as known with conventional lithium-ion batteries. Lithium metal may be provided in the anode and/or the cathode. For example, the anode of a lithium-ion battery may be replaced by an anode including lithium according to embodiments of the present invention. The introduction of an electrolyte in the battery may promote a reaction between the electrolyte and lithium metal in the anode, initiating the formation of a solid electrolyte interface (SEI) at the anode. Charging the battery for the first time may accelerate the formation of the SEI. Formation of the SEI from the lithium metal in the anode may reduce and/or eliminate capacity losses in the battery due to irreversible capacity losses caused by SEI consumption of lithium from the cathode.

For example, upon the initial charge of a lithium-ion battery having a lithium containing cathode material and only a non-lithium containing anode material, lithium from the lithium containing cathode material reacts with the electrolyte in the battery, forming a solid electrolyte interface (SEI) at the anode. The SEI consumes some of the lithium from the cathode, resulting in an irreversible capacity loss in the battery. Irreversible capacity loss in a battery may amount to a capacity loss of between 10 and 20 percent. However, if the anode of the lithium-ion battery is formed with lithium according to embodiments of the present invention, the lithium in the anode may react with the electrolyte to form the SEI at the anode during the initial charge of the battery. The formation of the SEI from lithium contained in the anode preserves the lithium in the cathode, or in the battery, resulting in a reduced capacity loss due to irreversible capacity. Thus, embodiments of the present invention may reduce and/or eliminate battery capacity losses due to the phenomenon known as irreversible capacity.

Batteries according to embodiments of the present invention can be used for various types of applications. For example, the battery can be used in portable electronics such as cellular phones, camcorders, and laptop computers, and in large power applications such as for electric vehicles and hybrid electric vehicles. Batteries employing lithium-containing anodes may provide greater options for choice of cathode materials-which may allow expanded uses for and/or safety of the battery. In addition, batteries employing lithium-containing anodes may reduce the effects of irreversible capacity on the battery.

The present invention provides batteries that may have a high specific capacity, safe operating conditions and good cycleability. In particular, non-lithiated materials can be used as cathode active material in some embodiments of a battery because lithium metal is provided in the anode. The non-lithiated materials may have higher specific capacities than the lithiated materials presently used in lithium-ion batteries. Unlike traditional lithium batteries having non-lithiated cathode active materials and metallic lithium anodes, it has been discovered that batteries produced using non-lithiated cathode active materials combined with the anodes of embodiments of the invention operate safely and do not generate lithium dendrites upon cycling. Furthermore, the batteries of embodiments of the present invention are safer to operate than lithium-ion batteries, which become unstable when lithium is removed from the cathode during charging. In particular, because the cathode active material in the batteries according to embodiments of the invention is typically in a fully charged state when the battery is originally prepared, it may be more stable then the cathode materials used in lithium-ion batteries. Moreover, the batteries of the invention can be charged and discharged numerous times while maintaining safe operating conditions and the high specific capacities of the cathode active materials. In addition, the presence of lithium in an anode material may help to reduce irreversible capacity loss in the battery because the lithium in the anode may be used to form the SEI rather than lithium from the cathode.

It is understood that upon reading the above description of embodiments of the present invention and reviewing the accompanying drawings, one skilled in the art could make changes and variations therefrom. These changes and variations are included in the spirit and scope of the following appended claims.

What is claimed is:
1. An electrochemical cell, comprising:
   (A) a cathode comprising an active material capable of being electrochemically lithiated, wherein the cathode does not comprise electrochemically removable lithium prior to the initial charge;
   (B) an anode separated from said cathode by a separating material, wherein the anode comprises a host material capable of absorbing and desorbing lithium in an electrochemical system and finely divided lithium metal powder dispersed within said host material, wherein the amount of lithium dispersed in the anode is no more than the maximum amount sufficient to intercalate in, alloy with and/or be absorbed by the host material after activation; and
   (C) an electrolyte in electrochemical communication with the cathode and the anode.

2. The electrochemical cell of claim 1, wherein the anode further comprises a binder polymer selected from the group consisting of polyvinylidene fluoride, ethylene propylene diene terpolymer, ethylene acrylic acid, ethylene vinyl acetate, and styrene-butadiene rubber.

3. The electrochemical cell of claim 1, wherein said host material comprises at least one material selected from the group consisting of carbonaceous materials, silicon, tin, tin oxides, composite tin alloys, transition metal oxides, lithium metal nitrides, graphite, carbon black, and lithium metal oxides.

4. The electrochemical cell of claim 1, wherein the finely divided lithium metal powder has a mean particle size of less than about 20 microns.

5. The electrochemical cell of claim 1, wherein the finely divided lithium metal powder comprises a stabilized low pyrophorosity powder.

6. The electrochemical cell of claim 1, wherein the finely divided lithium metal powder has a mean particle size of less than about 10 microns.

7. The electrochemical cell of claim 1, wherein the finely divided lithium metal powder comprises a pyrophoric powder.

8. A battery, comprising:
at least one electrochemical cell, wherein the at least one electrochemical cell comprises
(A) a cathode comprising an active material capable of being electrochemically lithiated, wherein the cathode does not comprise electrochemically removable lithium prior to the initial charge;
(B) an anode separated from the cathode by a separating material, wherein the anode comprises a host material capable of absorbing and desorbing lithium in an electrochemical system and finely divided lithium metal powder dispersed with the host material, wherein the amount of lithium dispersed in the anode is no more than the maximum amount sufficient to intercalate in, alloy with and/or be absorbed by the host material after activation; and
(C) an electrolyte in electrochemical communication with the cathode and the anode.

9. The battery of claim 8, wherein the battery comprises at least two electrochemical cells combined in series.

10. The battery of claim 8, wherein the anode further comprises a binder polymer selected from the group consisting of polyvinylidene fluoride, ethylene propylene diene terpolymer, ethylene acrylic acid, ethylene vinyl acetate, and styrene-butadiene rubber.

11. The battery of claim 8, wherein the finely divided lithium metal powder has a mean particle size of less than about 20 microns.

12. The battery of claim 8, wherein the finely divided lithium metal powder has a mean particle size of less than about 10 microns.

13. The battery of claim 8, wherein the finely divided lithium metal powder comprises a pyrophoric powder.

14. The battery of claim 8, wherein the finely divided lithium metal powder comprises a stabilized low pyrophorosity powder.

* * * * *